United States Patent [19]

Corpe et al.

[11] Patent Number: 5,795,015
[45] Date of Patent: Aug. 18, 1998

[54] HEADLINER ASSEMBLY AND LOCATING METHOD

[75] Inventors: Edward J. Corpe, Grosse Ile; Deborah Duffey, Canton; Jeffrey D. Elliott, Novi, all of Mich.

[73] Assignee: Ford Global Technologies, Inc., Dearborn, Mich.

[21] Appl. No.: 960,121

[22] Filed: Oct. 27, 1997

Related U.S. Application Data

[63] Continuation of Ser. No. 664,722, Jun. 17, 1996, abandoned.

[51] Int. Cl.⁶ .................................................. B60R 13/02
[52] U.S. Cl. ....................................................... 296/214
[58] Field of Search ............................ 296/214, 97.9, 296/39.1

[56] References Cited

U.S. PATENT DOCUMENTS

| | | | |
|---|---|---|---|
| 4,553,309 | 11/1985 | Hess et al. | 29/450 |
| 4,883,312 | 11/1989 | Kulis | 296/214 |
| 5,011,218 | 4/1991 | Danner et al. | 296/214 |
| 5,105,521 | 4/1992 | Dowd et al. | 29/453 |
| 5,106,149 | 4/1992 | Glossop, Jr. et al. | 296/213 |
| 5,120,593 | 6/1992 | Kurihara | 428/174 |
| 5,186,517 | 2/1993 | Gilmore et al. | 296/214 |
| 5,269,060 | 12/1993 | Dowd et al. | 29/897.2 |
| 5,280,991 | 1/1994 | Weiland | 296/214 |
| 5,544,928 | 8/1996 | Mori et al. | 296/67.9 |

*Primary Examiner*—Dennis H. Pedder
*Attorney, Agent, or Firm*—James J. Dottavio

[57] ABSTRACT

An automotive vehicle body and headliner assembly and locating method. The headliner has two locating holes. The body includes a pair of bodyside assemblies each with a door opening having a peripheral flange, a pair of A-pillar assemblies each having a reinforcement with a visor hole, and a roof assembly including a roof outer panel and front and rear roof headers longitudinally spaced along the roof outer panel. The A-pillar assemblies and bodyside assemblies are secured to the roof assembly. Locators are provided on the body for locating the headliner with respect to the body. The locators are located laterally on the body relative to one of the bodyside assemblies. The locators are alignable with the locating holes in the headliner.

11 Claims, 7 Drawing Sheets

HEADLINER ASSEMBLY AND LOCATING METHOD

This application is a continuation of application Ser. No. 08/664.772. filed Jun. 17, 1996, now abandoned.

BACKGROUND OF THE INVENTION

1. Field of the Invention

This invention relates to an automotive body and headliner assembly and a method for locating the headliner with respect to the body.

2. Description of the Prior Art

In an automotive vehicle of the prior art, the headliner is installed into a welded and painted body to provide acoustic damping and improve the appearance of the interior of the vehicle. Generally, precise location of the headliner in the vehicle is not required, because painted metal or molded plastic garnish trim covers the edges of the headliner. The headliner of the prior art is often located by aligning visor holes provided in the headliner to visor holes in the A-pillar assembly. Alignment of the visor holes is performed primarily to ensure the visors may be installed in the vehicle.

The welded A-pillar assembly is a multiple-piece construction which includes the A-pillar reinforcement. The location of the A-pillar reinforcement, which includes the holes to which the headliner is aligned, is subject to variation in the position and size of the several pieces which comprise the A-pillar assembly. This variation ultimately leads to variation in the position of the headliner in the vehicle. Furthermore, the visor hole in the reinforcement is not located precisely in the vehicle because this has not been perceived as being critical.

In modern vehicles, it is desirable to reduce the quantity and size of trim pieces, including headliner garnish moldings, to reduce cost and weight, plus improve appearance. Hence the location of the headliner becomes more critical. This is particularly evident at the door openings where frequently the edge of the headliner is covered by a lip provided on the door opening weatherstrip. The overlap of the lip on the weatherstrip to the headliner is usually approximately 6 millimeters, and the variation for installation of the headliner could exceed this using prior art installation methods, resulting in the edge of the headliner being visible.

It would therefore be desirable to provide an automotive body and headliner assembly and a method to accurately locate the headliner in the body.

SUMMARY OF THE INVENTION

It is an object of the present invention to provide an automotive body and headliner assembly and a method which locates the headliner in the body.

According to the present invention, an automotive vehicle body and headliner assembly is provided which includes a headliner having two locating holes. The body includes a pair of bodyside assemblies each with a door opening having a peripheral flange, a pair of A-pillar assemblies each having a reinforcement with a visor hole, and a roof assembly including a roof outer panel and front and rear roof headers. A locating means is provided on the body for locating the headliner with respect to the body. The locating means is located laterally on the body relative to one of the bodyside assemblies. The locating holes in the headliner are alignable with the locating means in the body. Thus, the headliner will be accurately positioned with respect to the body.

The above object and other objects and features of the invention will be readily appreciated by one of ordinary skill in the art from the following detailed description of the best mode for carrying out the invention when taken in connection with the following drawings.

DESCRIPTION OF THE PREFERRED EMBODIMENTS

Figure 1:
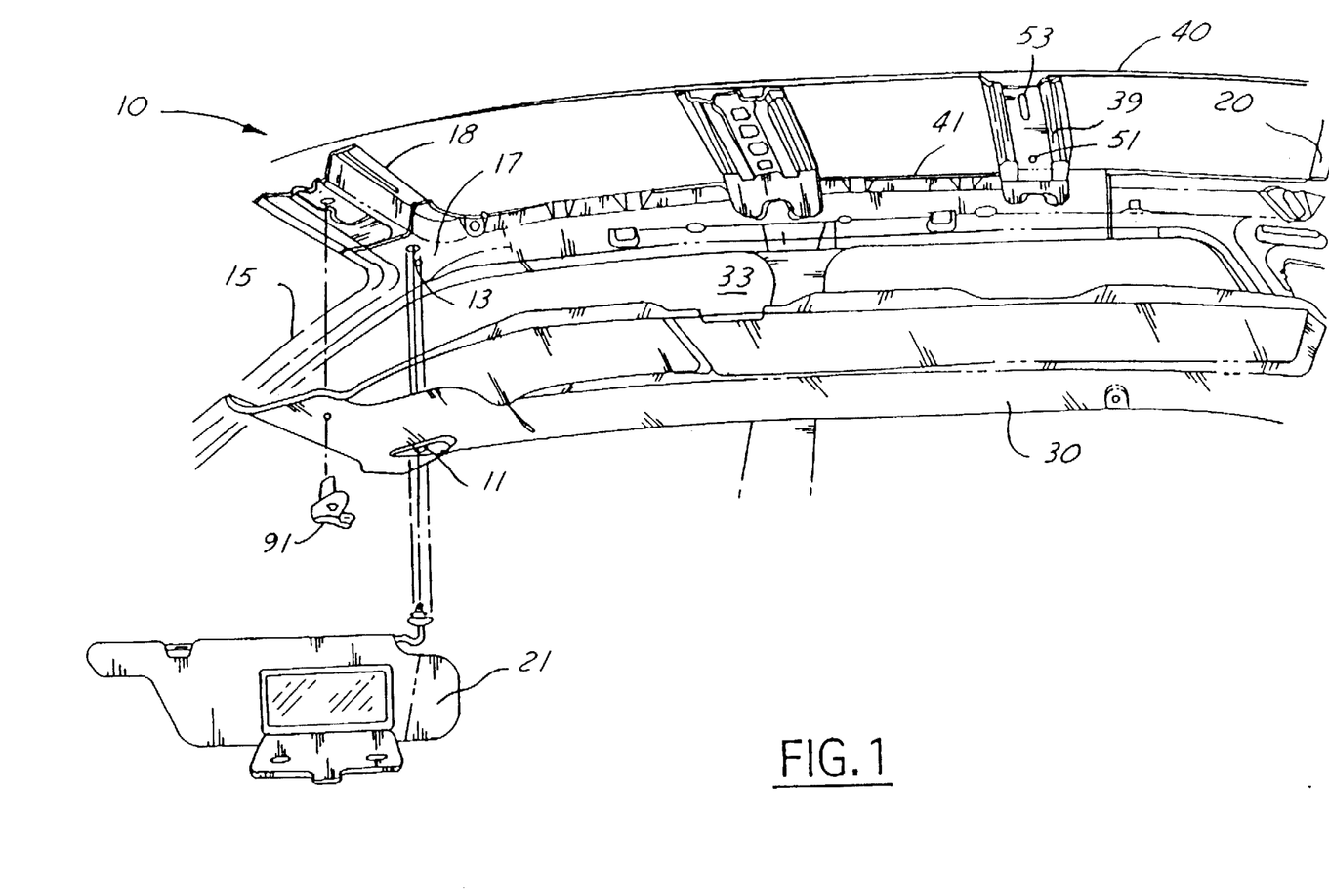
FIG. 1 is a partial exploded view of a prior art headliner and body assembly.

In a motor vehicle of the Prior Art, as illustrated in FIG. 1, a headliner 30 of the prior art is positioned with respect to a body 10 typically by aligning a hole 11 for a visor 21 in the headliner to a hole 13 in the A-pillar assembly 15, as described in U.S. Pat. No. 4,553,309 to Hess, et al.

In a prior art body-in-white or a body structure construction, an A-pillar assembly 15 consists of a multiple-piece construction. The A-pillar assembly 15 includes a reinforcement 17 having a hole 13 to accommodate a visor 21. Each component of the A-pillar assembly, including the reinforcement 17, and each feature of the components, such as the hole 13 provided in the reinforcement 17, has a manufacturing tolerance and assembly tolerance associated therewith. Thus, as the reinforcement 17 is formed the reinforcement includes tolerances for the size of the part, location of the hole, and location of the locating features. As the reinforcement 17 is welded to the A-pillar assembly 15, and the assembly 15 is welded to the body 10, the tolerances stack up, causing variation in the location of the visor holes 13.

Because the prior art designs provided garnish moldings (not shown) to cover the edges of the headliner, location of the headliner 30 and the location of the visor holes 13 was often not an important consideration. However, as the design practice of providing garnish moldings (not shown) was eliminated, particularly above the door opening 33, improper location of the visor holes 13 resulted in excessive variation in the position of the headliner 30.

Figure 2:
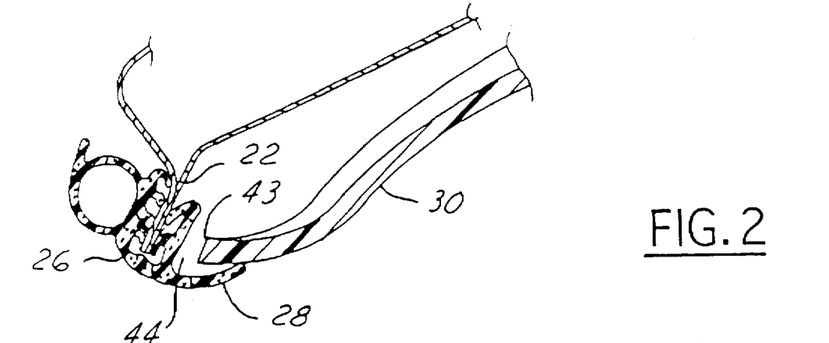
FIG. 2 is a partial sectional view at a door opening of a prior art headliner, weatherstrip and body assembly.

As shown in FIG. 2, peripheral flanges on the door openings 22, 24 carry the weatherstrip 26. In designs where a garnish molding (not shown) is not present, the weatherstrip 26 typically includes a flexible lip 28 to cover the edge 43 of the headliner 30. Due to variation in location of the headliner 30 with the prior art design, the lip 28 was not long enough to accommodate the variation and cover the edge 43 of the headliner 30. Therefore the gap 44 between the edge 43 of the headliner 30 and the weatherstrip 26 may not be covered entirely by the lip 28, and is therefore unsightly.

Figure 3:
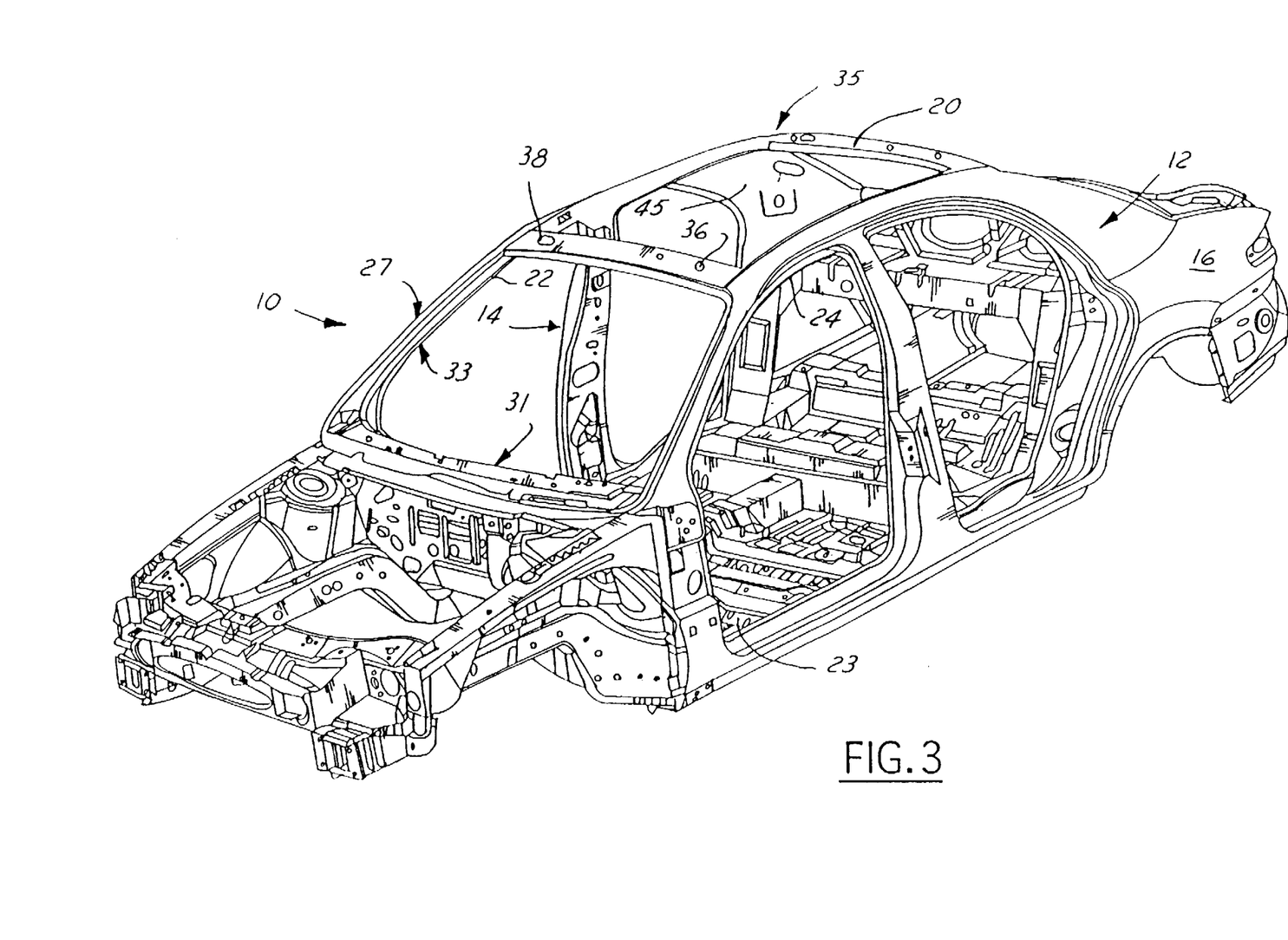
FIG. 3 is a perspective view of a partially assembled automotive body according to the present invention.

As illustrated in FIG. 3, the body-in-white or body-structure of a preferred embodiment comprises a welded sheet metal body 10. The structure of the body 10 is similar to the prior art design, and is therefore not discussed in detail. Welded construction is also well known in the art, and the welding process itself therefore will not be described herein. However, the locating process which is used during the assembly process will be described further. One skilled in the art recognizes that the welding process could alternatively comprise securing the body components using adhesives or welding plus adhesives or mechanical fasteners, such as rivets or screws or any other known means. Furthermore, a plastic or aluminum body construction could be used, the attachment of which utilizing fasteners, adhesives and/or welding or any other method known in the art.

Conventionally in a motor vehicle the longitudinal axis of the vehicle is referred to as the x-axis. The lateral axis of the vehicle perpendicular the x-axis is referred to as the y-axis. The vertical axis is referred to as the z-axis. This convention will be followed in the following description.

According to the present invention, locators are formed on each component to position the component in each of the x, y and z axes precisely within the motor vehicle. The locators in a preferred embodiment are generally defined herein as holes in sheet metal which are positioned over steel pins provided on assembly fixtures. One skilled in the art recognizes the holes and pins could be replaced, for example, by molding bosses on a plastic part and providing holes in the fixture. Likewise, details, such as tabs or bosses, could be formed on the metal parts to locate the parts, or an edge or formed surface on the part could be utilized as a locator.

Generally, each stamped component is formed with a pair of locating holes for locating the component in the stamping and assembly processes. During stamping the locating holes may be deformed, so a parallel set of locating holes may be formed for the assembly process. The locating holes typically comprise a round hole and an elongate slot. Each of the locating holes is fitted over a pin in a fixture. The round hole fits over a first pin to thus locate the part in two axes in each sense, such as the +/-x and +/-y directions, and is therefore called a fourway locator. The elongate hole locates the part over a second pin in a single axis, such as the +/-y directions, and is therefore called a two-way locator. The slot, in cooperation with the hole, prevents rotation of the part about the z-axis in the above example. Each component is also formed with locating surfaces. Typically at least three surfaces are provided to define a plane for locating the part.

Furthermore, each welding fixture has pins which engage the locating holes in each part, as described above. The pin is preferably round, but may be square, diamond-shaped, or any other geometry which provides a bearing surface against each edge of the hole on which the pin bears to locate the part in a particular axis. The fixture further includes surfaces which cooperate with the plane-defining locating surfaces on the part. Typically a clamp is provided on the fixture to secure the part at these locating surfaces while the part is in the fixture. Thus each component is precisely located in the welding fixture. Similarly, locators are used during the stamping operation to precisely form the part.

The body 10 shown in FIG. 3 includes a plurality of assembled body components, including body panel 16 and reinforcements 45. The body 10 further includes a pair of bodyside subassemblies 12, 14, each of which comprises a stamped bodyside outer panel 16 and a plurality of stamped reinforcements, indicated for example at 45, welded thereto. The bodyside panels 16 and reinforcements 45 are located and clamped in one or more subassembly fixtures and welded into bodyside subassemblies 12, 14.

Figure 4:
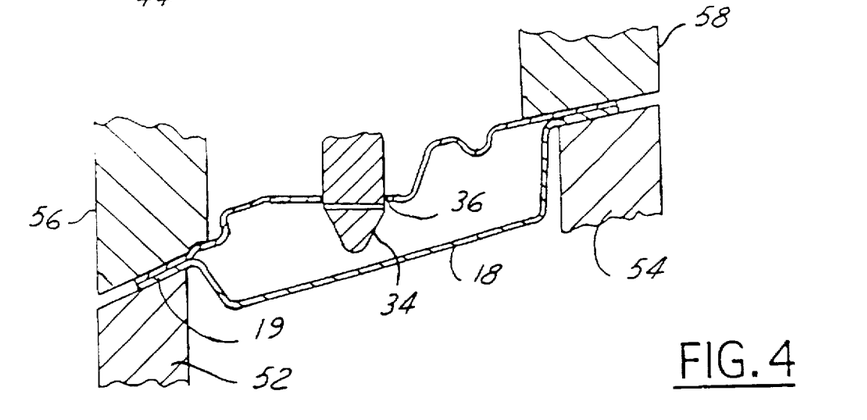
FIG. 4 is a partial sectional side view of a header locator according to the present invention.
Figure 11:
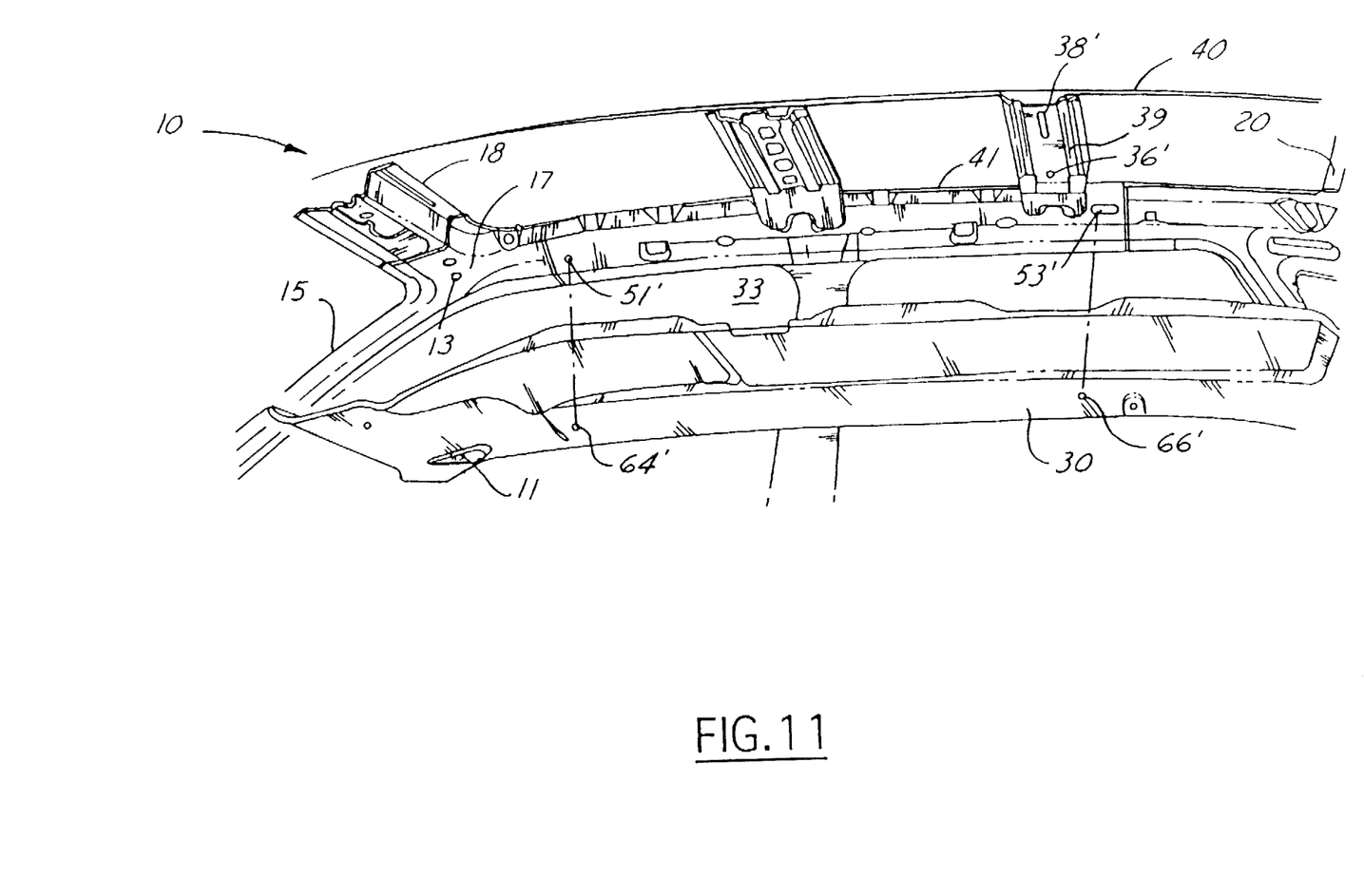
FIG. 11 is a partial exploded view of a headliner and body assembly including locating holes in a bodyside assembly.

As used herein, "located" means precisely positioning the part using locators, such as the pins and holes as defined above. As illustrated in FIG. 4, one section of a header 18 is shown using a locating scheme according to the present invention. A typical section exists, but is not shown, for the rear header 20, shown in FIG. 3, and the other assemblies of the body 10. It is understood that the locating scheme explained herein is illustrative of the locating scheme for each part of the body assembly. In FIG. 4, at least two, and preferably at least three, usually parallel surfaces 19 are provided on the header 18 to define a plane to locate the header 18 against locating blocks 56, 58 in the fixture. Clamps 52, 54 lock the surfaces 19 against the blocks 56, 58 FIG. 11 shows roof bow locating holes 36', 38'.

Figure 6:
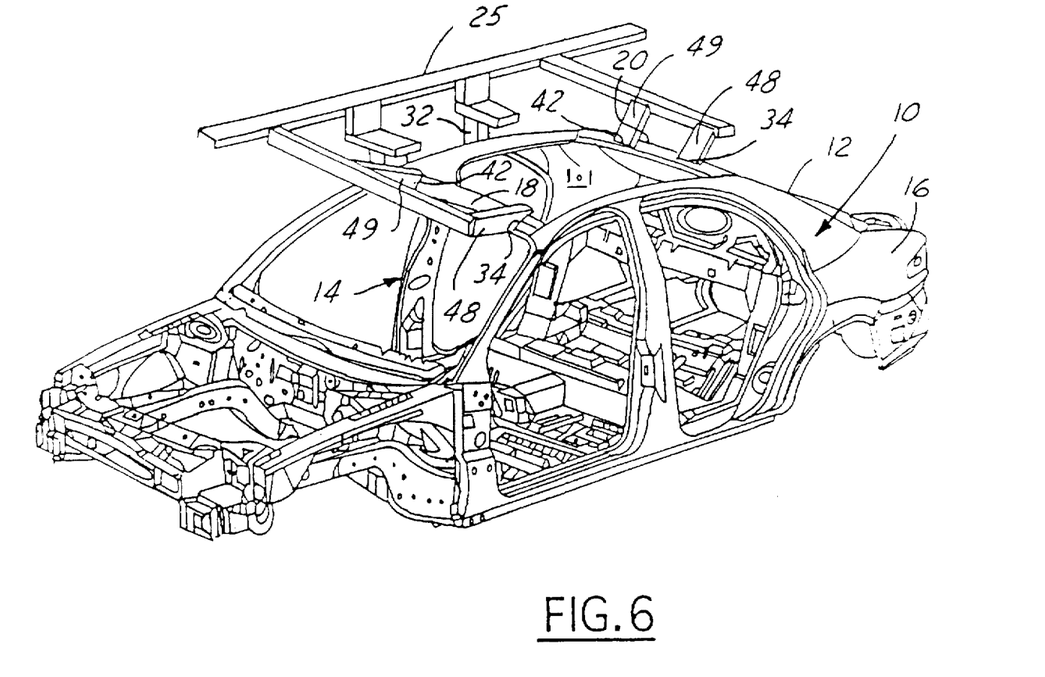
FIG. 6 is an illustration of a fixture locating body components according to the present invention.

A first locating pin 34 is provided on the fixture (not shown in FIG. 3) to engage a locating hole 36 in the header 18. The pin 34 is sized to fit into a generally round hole 36 provided in the header 18. The pin 34 is sized to fit the hole 36 in at least both of two directions in each of two axes, such as the x and y axes as described above, and therefore locates the header 18 in four directions in the plane defined by the surfaces 19. A second pin (not shown) is provided to engage an elongate hole 38 in the header 18 shown in FIG. 3, and is sized to fit the second hole 38 in both directions in one axis. The second pin, in combination with the first pin 34, locates the header 18 against rotation in the plane defined by the surfaces 19. The surfaces and pins as described above thus precisely position the header 18 completely in the fixture 25 as shown in FIG. 6. Roof bows 39 may likewise be located using a pair of locating holes 51, 53 as shown in FIG. 1.

Likewise, each of the other body components is located and welded into an appropriate subassembly, then located and welded into the body assembly 10. As shown in FIG. 3, the bodyside assemblies 12, 14 are joined by welding the floorpan subassembly 23 and roof reinforcements, including roof headers 18, 20 and roof bows (not shown), to the bodyside subassemblies 12, 14. As shown in FIG. 3, the headers 18, 20 extend laterally across the body 10 in the y-axis at the front and rear of the roof.

As shown in FIG. 1, roof bows 39 extend laterally between the bodysides 12, 14 and in spaced relationship between and generally parallel to the front and rear headers 18, 20 to provide additional support for the roof panel 40. Further separate side headers, or roof rails, 41 may be provided extending longitudinally in the x-axis between the front and rear headers 18, 20 to provide additional support for the roof panel 40. In a preferred embodiment shown in FIG. 3, the structure of side headers is provided in the top portion of the bodyside subassemblies 12, 14. The top of the bodyside assemblies 12, 14 and front and rear headers 18, 20 thus define the perimeter 35 of the support for the roof outer panel, which is welded to the headers 18, 20, bodyside assemblies 12, 14 and roof bows, thereby forming the roof assembly. The body 10 further comprises A-pillar assemblies 27, 29 and a cowl assembly 31, which, in combination with the roof assembly complete the outline of a windshield opening 33 as is well known in the art.

Each subassembly is welded, then transferred to a body framing fixture, or body buck fixture 25, as partially shown in FIG. 6. The body buck fixture 25 is provided to locate the subassemblies while the subassemblies are being welded to construct the body 10 . Each subassembly is located as described above into the buck 25, clamped and welded. The buck 25 provides locating features as described above for each subassembly as required, but for clarity FIG. 6 illustrates only the portion of the buck 25 for locating the headers 18, 20. The front and rear headers 18, 20 are located relative to the bodyside assemblies in the body buck fixture 25. Preferably the locators used in the subassembly welding fixture are the same locators used in the bodyside fixture, thus providing consistent location and minimizing variation throughout the assembly process.

Figure 5:
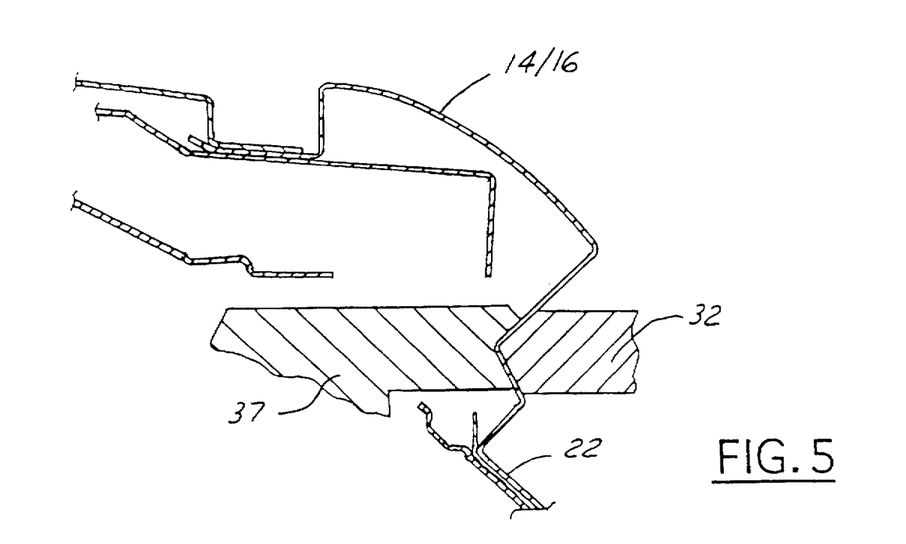
FIG. 5 is a partial sectional side view of a door opening locating block according to the present invention.

As shown in FIGS. 5 and 6, a block 32, conforming to the shape of a surface on the bodyside subassembly 12, 14, is provided on the body buck fixture 25. The block 32 nests against a surface on the bodyside near the door opening 22, 24 in a preferred embodiment. As shown in FIG. 5, a clamp 37 holds the bodyside 12, 14 against the block 32, and thereby locates the bodyside generally in the y-axis. Within the same fixture 25 shown in FIG. 6, a block 48 supports the pin 34 shown in FIG. 4. The pin 34 is located relative to the block 32 shown in FIG. 6 for each of the front and rear headers 18, 20. The pins 34 are provided as 4-way locators for the roof headers 18, 20. A 2-way locating pin 42 is also provided for each header 18, 20, supported by a second block 49.

As shown in FIG. 3, each header 18, 20 has a pair of holes 36, 38 which, in a preferred embodiment, comprise a first hole 36 having a round diameter with a close fit to a first pin 34 and a slot 38 fitting to the second pin 42. Thus, the fixture locates the bodysides 12, 14 and headers 18, 20, providing location of the roof headers relative to the door opening 22, 24. The fixture 25 locates the headers 18, 20 and bodysides 12, 14 directly, so no additional tolerance stack ups exist from prior subassemblies such as the A-pillar reinforcement of the prior art and relative variation, particularly in the y-axis, is minimized. As described above but not shown in FIG. 6, surfaces are also provided in the headers 18, 20 and blocks and clamps are provided in the fixture 25 to locate the headers in the z-axis.

Alternatively, the headers 18, 20 may be located relative to the door opening 22, 24 by providing alternative locating features, such as holes (not shown) in the bodyside assembly 12, 14. In such an assembly, the door openings 22, 24 are formed in the bodysides relative to the holes (not shown). The locating hole is then used to locate the bodyside in the buck 25 and the headers 18, 20 are located in the buck 25 relative to the bodyside locating hole (not shown) provided relative to the door openings 22, 24. Once the headers 18, 20 and bodysides 12, 14 are located, clamps hold the subassemblies in place while the body is welded as described above.

Precise location of the headliner 30 in the y axis is of most concern, because misalignment between the headliner 30 and the lip 28 on the weatherstrip 26, shown in FIG. 2, is most noticeable. However, the principles discussed herein provide precise positioning of the headliner in all axes. The roof headers 18, 20 shown in FIG. 3 preferably include locating features for the headliner 30.

Figure 7:
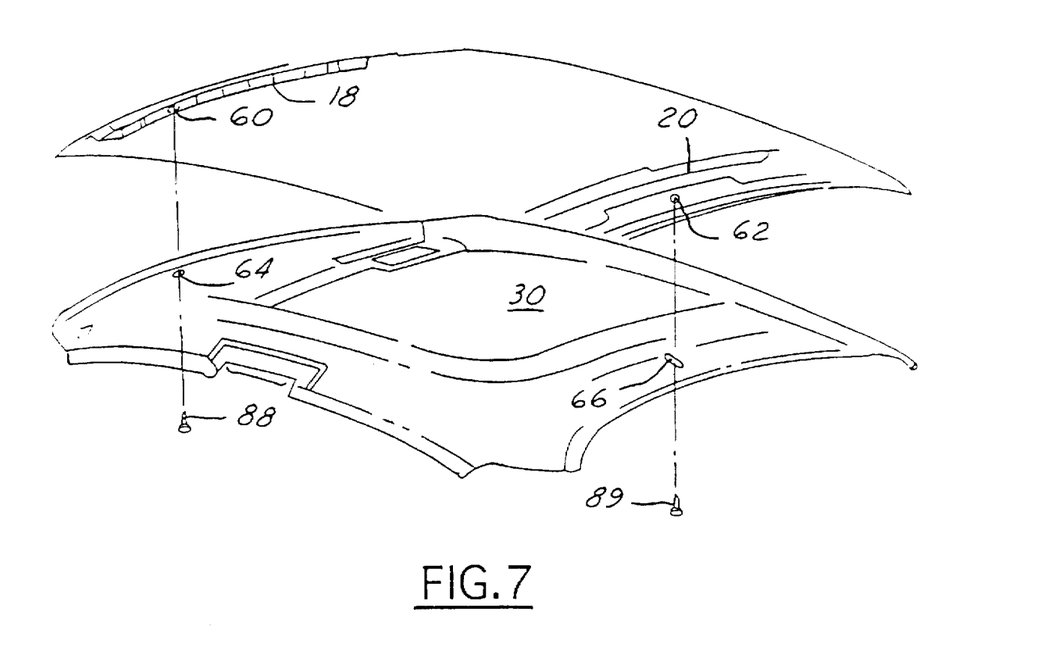
FIG. 7 is a view of a headliner installation according to the present invention.
Figure 10:
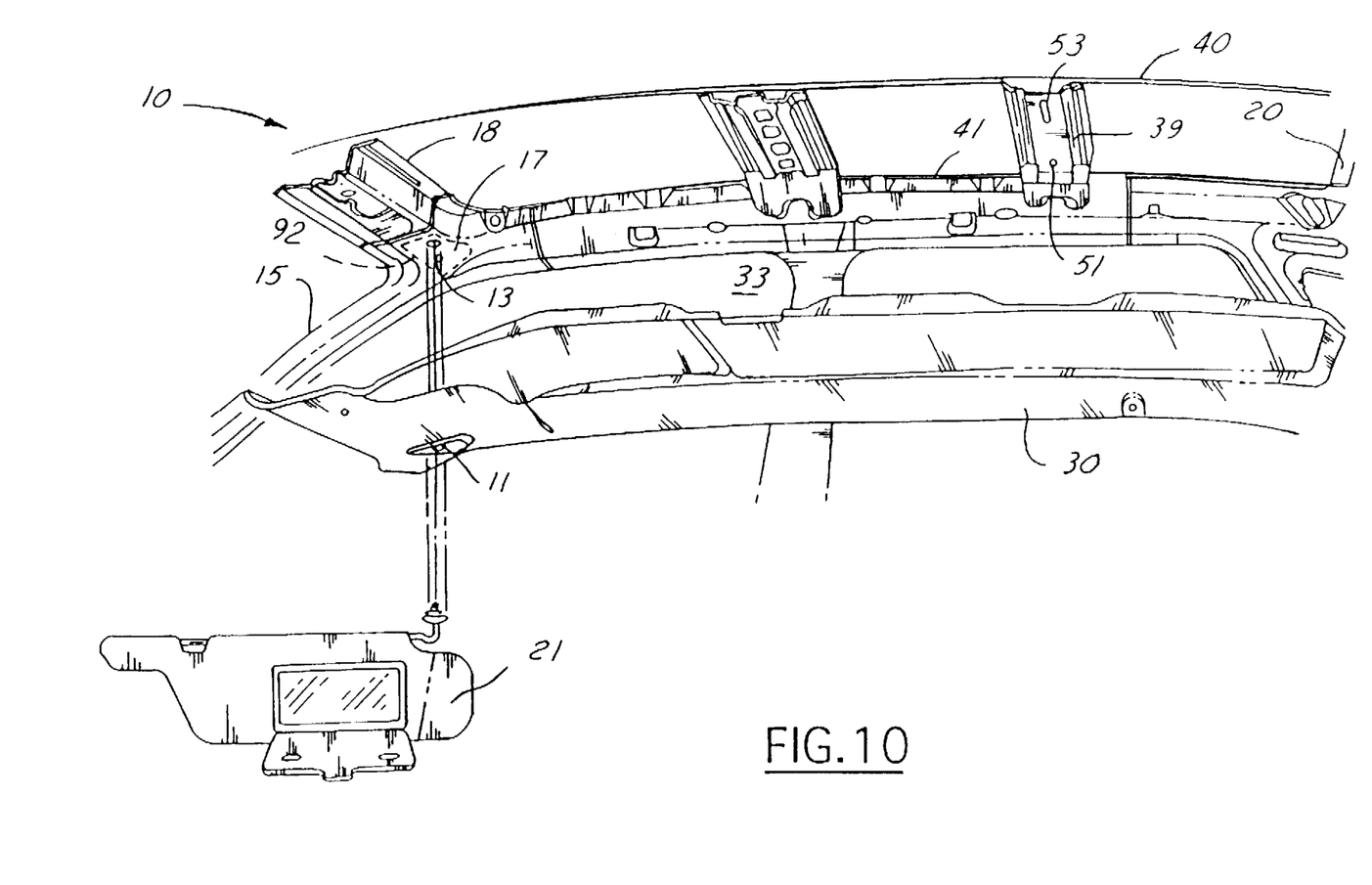
FIG. 10 is a partial exploded view of a headliner and body assembly including locating holes in a roof bow.

In a preferred embodiment, as shown in FIG. 7, the body construction providing for location of the headliner 30 in the x and y axes is controlled by providing locating holes 60, 62 in the roof headers 18, 20 alignable with locating holes 64, 66 in the headliner 30 at the front and rear of the headliner 30, respectively. One skilled in the art would recognize that these locating holes could be provided in roof headers, roof bows 51, 53 (FIG. 10 ), bodysides 51', 53' (FIG. 11) or any other body structure adjacent the headliner in the motor vehicle, alignable with a hole in the headliner, preferably forming the boundary for the space to be covered by the headliner. However, the body component having the locator must be located as described above to reduce the variation in body build and provide a precise locator for the headliner 30. It is therefore preferred the holes are not in the A-pillar reinforcements as is prior art designs, as the location of the reinforcement typically follows the location of the A-pillar assembly. Therefore the locating holes are preferably spaced from the reinforcements by placing the locating holes in another component as described above.

In a preferred embodiment, the front and rear header 18, 20 are used to locate the headliner, because they are the furthest distant points on the headliner and thus provide the minimum angular variation for a given discrepancy in locator position and capable of precise positioning with the method described herein. A second preferred embodiment uses one of the side headers having a four-way locator to locate the headliner in the x and y-axes and the other side header having a two-way locator in the x-axis. Like the front and rear headers, the side headers minimize variation to the door opening and define the boundary of the area covered by the headliner and thus minimize angular variation.

Figure 8:
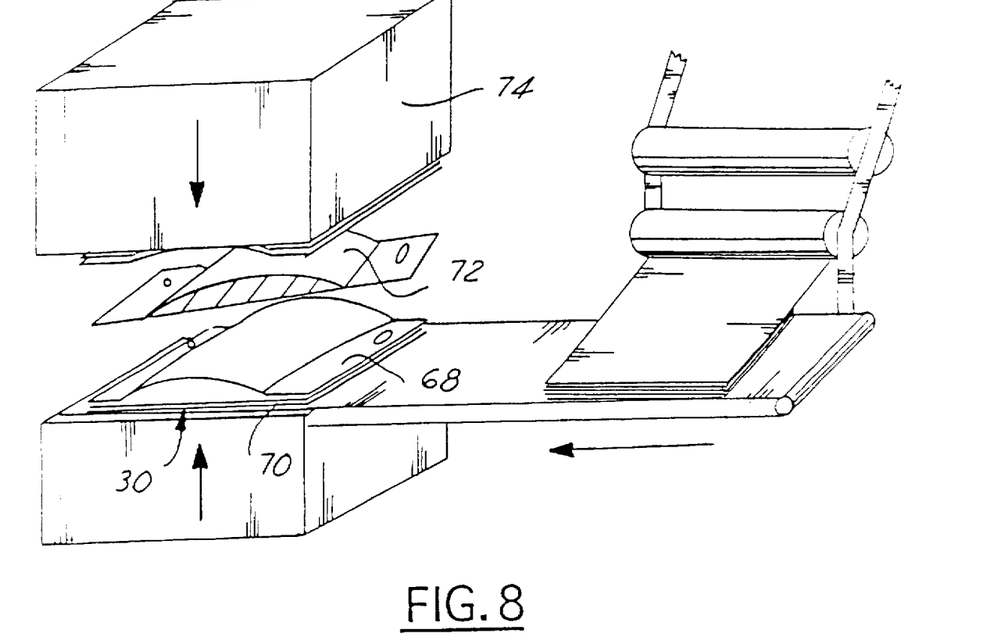
FIG. 8 is a view of a headliner manufacturing process according to the present invention.

The headliner may comprise a molded headliner or any other roof trim construction as is known in the art. In a preferred embodiment, as shown in FIG. 8, the headliner 30 comprises a substrate 68 such as fiberglass, polyurethane or any known headlining material. A preferred headliner is a formed laminated fiberglass headliner having a fiberglass substrate 68 which is compressed in a steam pressure press 74, and covered with a fabric material 70 which may have a foam backing (not shown). A scrim 72 may also cover the backside, or the nonvisible side of the headliner 30 adjacent the body 10. The headliner is initially formed with excess material, typically called offal 76, around the perimeter of the headliner 77.

Figure 9:
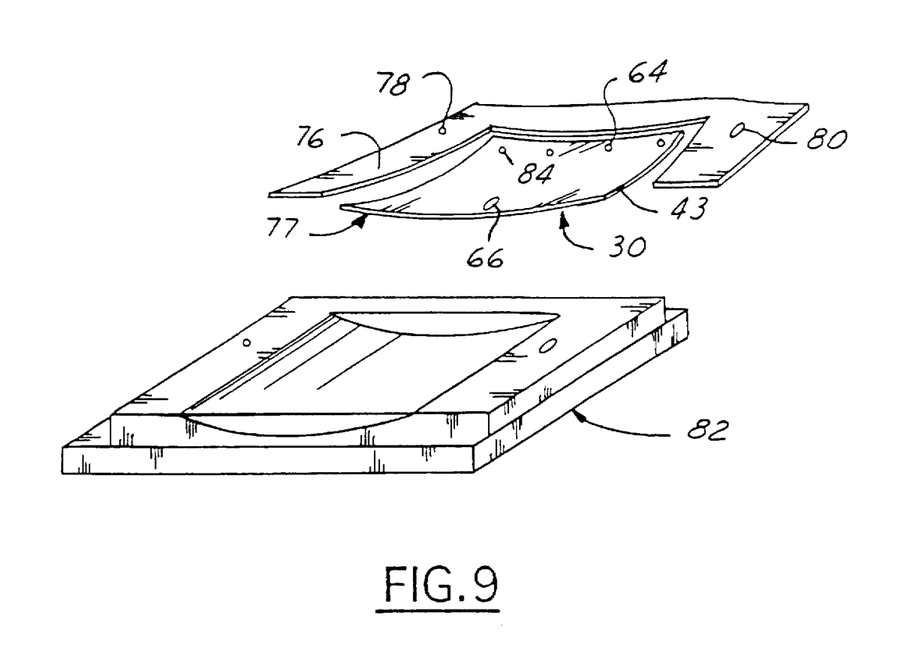
FIG. 9 is a view of a headliner cutting process according to the present invention.

As shown in FIG. 9, manufacturing locators 78, 80 are formed in the offal 76 which is cut off after the headliner is molded and covered. After the headliner is formed, it is put into a trim die 82, such as a steel rule die or a water jet cutter. This cutter forms openings 84 in the headliner for securing accessories, such as visors, coat hooks, grab handles, consoles and such. The trim operation also trims the perimeter 77 of the headliner 30. According to the present invention a pair of locating holes 64, 66 are cut in the headliner 30 during the trim operation. Thus, these locators are formed in the same operation and located in the same fixture in which the edges 43 of the headliner 30 are formed, thus minimizing variability between the locating holes 64, 66 and the important edges 43 of the headliner 30. Alternatively, the headliner 30 comprises a cut-and-score, molded fiberboard, or any other known roof trim construction having similar locators formed during the manufacture process relative to the edges 43 of the headliner 30.

In a preferred embodiment, as shown in FIG. 7, a four-way locator 64 is provided near the front edge of the headliner, registering with a locator 60 provided in the front roof header 18. A trim attachment, preferably one of the brackets (not shown) which holds the visor (not shown), is used as a locator at this position. The locator 64 in the headliner is shown having a round shape, but is preferably a rectangular aperture which coordinates with the rectangular shape of the visor bracket in the x and y axes. Alternately, as shown in FIG. 7, a round hole 64 is provided in the headliner at this position, alignable with a round push pin hole 60 in the roof header and a push pin 88 is inserted through the headliner 30 into the header 18 to align and secure the headliner 30 thereto.

A two-way locator 66 is provided near the rear edge of the headliner 30 alignable with a hole 62 in the rear roof header. The location is accomplished using a second trim attachment, such as a dome lamp or coat hook, or preferably using a push pin 89 similar that shown in FIG. 7. The rear locator, being a two-way locator, is a slot having a longitudinal axis projecting in the x direction. Thus, variability in the headliner assembly or position of the roof headers in the automotive body assembly is minimized in the side-to-side variation of the vehicle. Because the headliner is compressible, the two-way locator may be consist of a round hole which is deformed if necessary during installation of such a push pin 89.

Having the four-way locator 64 at the front of the headliner 30 provides minimum variation at the front of the headliner in the motor vehicle, which is the portion of the headliner 30 most visible to an occupant of the motor vehicle. The majority of the variation will be accommodated at the rear of the headliner in the two-way locator 66, which is less visible to an occupant of the vehicle.

When the headliner 30 is installed in the body 10 shown in FIG. 3, the headliner is passed through the windshield opening 33 and positioned adjacent the interior of the roof sheet metal 40. Once inside the vehicle, as shown in FIG. 7, the headliner holes 64, 66 are aligned with respect to the locating holes 60, 62 in the roof headers 18, 20. In a preferred embodiment the locating visor bracket (not shown) or pushpins 88, 89 are installed through the headliner 30 and engage the locating holes in the headers 60, 62. The pushpins 88, 89 are well-known in the art and commercially available from many suppliers including ITW, Inc. The pushpin is typically the same dimension as, or slightly smaller than, the diameter of the locating hole 64 and the width of the locating slot 66. However, an interference fit may be provided in the instance that the substrate is displaceable, such as a molded fiberglass headliner. However, in a preferred embodiment a 0.1 millimeter clearance is provided to facilitate ease of installation.

The front headliner locator 64 is installed first to provide location of the headliner in the x and y position. Furthermore, when each headliner locator is seated, the backside of the headliner, opposite the visible side of the headliner, is located against the header, thereby providing location in the z-axis as well. Therefore, the surface of the header adjacent the holes 60, 62 is located in the z-axis during manufacture and assembly, as is the mating headliner 30 surface.

Once the front locator is fastened, the slot 66 at the rear of the headliner is aligned relative to the hole 62 in the rear roof header and the second fastener is installed. Thus, the headliner is located in the x, y and z dimensions at the front and rear of the headliner, and the pushpins serve to help hold the headliner in position until the accessories, such as the visors, coat hooks, and such, are installed to fully secure the headliner.

In an alternate embodiment, the pushpins of a preferred embodiment are not used. An assembly aid (not shown) is used only to align the headliner, but which is removed from the vehicle. An assembly aid may comprise a small hand tool or a pin having an outside diameter slightly smaller than the headliner hole 64, 66. The assembly aid is inserted through the headliner hole 64, 66 into the locator hole in the header 60, 62 to position the headliner 30 until the visors, grab handles and such are secured. A further embodiment (not shown) uses assembly aids in conjunction with a glued-in headliner process as is known in the art, where the headliner is adhered to the roof (not shown). In such an embodiment, the pushpins or assembly aids are inserted through the headliner into the locating holes in the roof header until a pre-glued headliner is pressed into position in the vehicle.

Still further, the headliner may be installed using a robot (not shown). The robot may include a detail, such as a pin (not shown), which locates the headliner by engaging the locating holes 60, 62 in the roof headers 60, 62 through the headliner locating holes 64, 66 to align the headliner 30 relative to the body 10. Using such a robot, typically the headliner is glued into place. An operator may then install pushpins and/or components secured to the roof, such as visors, grab handles, coat hooks and such, holding the headliner in place.

The locating holes in the roof headers 18, 20 and headliner 30 preferably are used with a vision system (not shown) to align the headliner, particularly in conjunction with a robotic installation process. In such an application, sensors (not shown) would sense the hole in the roof headers and align the headliner relative to the holes. Again, the securing process would then comprise using adhesives, pushpins, or other components being attached to the roof as described above.

Although the preferred embodiments of the present invention have been disclosed, various changes and modifications may be made without departing from the scope of the invention as set forth in the appended claims.

What is claimed is:

1. An automotive body and headliner assembly, comprising:
   a headliner having first and second locating holes therethrough; and
   a vehicle body including a roof assembly having a roof outer panel and front and rear roof headers spaced longitudinally along the outer panel, a pair of bodyside assemblies each having a door opening with a peripheral flange, a pair of A-pillar assemblies, said A-pillar assemblies and bodyside assemblies being secured to said roof assembly, and said roof assembly defining the top of a windshield opening; and
   locating means comprising a 2-way locator and a 4-way locator provided on the body for locating the headliner with respect to the body, said locating means being alignable with the locating holes in the headliner.

2. An automotive body and headliner assembly according to claim 1, wherein the A-pillar assemblies include a reinforcement for mounting a visor and the locating means comprises said body having third and fourth locating holes therein, the third and fourth holes being spaced from said reinforcements.

3. The body and headliner assembly according to claim 2, wherein the first hole is a four-way locator alignable with the third hole, the second hole is a two-way locator alignable with the fourth hole.

4. The body and headliner assembly according to claim 3, wherein the first hole comprises an aperture in the headliner sized to locate the headliner in two axes using a first trim attachment.

5. The body and headliner assembly according to claim 4, wherein the second hole comprises a slot in the headliner sized to locate the headliner in one axis using a second trim attachment.

6. The body and headliner assembly according to claim 5, wherein the first trim attachment comprises a visor bracket and the second trim attachment comprises a push pin.

7. The body and headliner assembly according to claim 2, wherein the third hole is provided in the front roof header and the fourth hole is provided in the rear roof header.

8. The body and headliner assembly according to claim 7, further comprising the front and rear roof headers each having a pair of header locating holes, said header locating holes being spaced from the third and fourth locating holes, each header being located in a fixture during assembly of the body, the fixture locating each of the headers, respectively, relative to the one of said bodyside door openings using the header locating holes.

9. The body and headliner assembly according to claim 2, wherein the third and fourth holes are provided in one of said bodyside assemblies.

10. The body and headliner assembly according to claim 2, wherein the body further comprises:

a first and second roof bow, each roof bow having a pair of roof bow locating holes formed therein for locating each of the roof bows, respectively, relative to the bodyside door opening using the bow locating holes prior to securing the bows to the body.

11. An automotive body and headliner assembly, comprising:

a headliner having a first locating hole with a generally round shape acting as a 4-way locator and a second locating hole with a oblong shape having parallel sides acting as a 2-way locator, said second hole being spaced from said first hole;

a vehicle body including a roof assembly having a roof outer panel and front and rear roof headers spaced longitudinally along the outer panel, a pair of bodyside assemblies each having a door opening with a peripheral flange, a pair of A-pillar assemblies, said A-pillar assemblies and bodyside assemblies being secured to said roof assembly, and said roof assembly defining the top of a windshield opening, wherein one of said bodyside assemblies has a locating surface provided on the peripheral flange of the body opening and said front and rear roof headers are located laterally relative thereto and each of said front and rear headers has a locating hole provided therein in registration with the headliner locating holes for locating the headliner to the body.

* * * * *